United States Patent
Arunasalam et al.

(10) Patent No.: US 10,094,490 B2
(45) Date of Patent: *Oct. 9, 2018

(54) MICROVALVE HAVING CONTAMINATION RESISTANT FEATURES

(71) Applicant: DunAn Microstaq, Inc., Austin, TX (US)

(72) Inventors: Parthiban Arunasalam, Austin, TX (US); E. Nelson Fuller, Manchester, MI (US); Chen Yang, Austin, TX (US); Joe A. Ojeda, Sr., Austin, TX (US)

(73) Assignee: DUNAN MICROSTAQ, INC., Austin, TX (US)

(*) Notice: Subject to any disclaimer, the term of this patent is extended or adjusted under 35 U.S.C. 154(b) by 72 days.

This patent is subject to a terminal disclaimer.

(21) Appl. No.: 15/175,766

(22) Filed: Jun. 7, 2016

(65) Prior Publication Data

US 2016/0369916 A1 Dec. 22, 2016

Related U.S. Application Data

(60) Provisional application No. 62/180,107, filed on Jun. 16, 2015.

(51) Int. Cl.
*F16K 99/00* (2006.01)

(52) U.S. Cl.
CPC ...... *F16K 99/0005* (2013.01); *F16K 99/0044* (2013.01)

(58) Field of Classification Search
CPC ............ F16K 99/0005; F16K 99/0044; F16K 99/0011; F16K 99/0028; F16K 3/316; F16K 3/0263; F16K 25/005; F16K 25/04

USPC ................ 251/193–204, 300–303, 326–329
See application file for complete search history.

(56) References Cited

U.S. PATENT DOCUMENTS

| | | | |
|---|---|---|---|
| 3,934,850 A | 1/1976 | Kurkjian, Jr. | |
| 4,053,283 A * | 10/1977 | Schneider | B29B 7/7684 137/625.4 |
| 4,581,624 A | 4/1986 | O'Connor | |
| 4,651,973 A | 3/1987 | Oliver | |
| 5,058,856 A | 10/1991 | Gordon et al. | |
| 5,069,419 A | 12/1991 | Jerman | |
| 5,178,190 A | 1/1993 | Mettner | |
| 5,211,373 A * | 5/1993 | Baker | F16K 3/186 251/196 |
| 5,333,831 A | 8/1994 | Barth et al. | |
| 5,780,748 A | 7/1998 | Barth | |

(Continued)

*Primary Examiner* — Michael R Reid
(74) *Attorney, Agent, or Firm* — MacMillan, Sobanski & Todd, LLC

(57) ABSTRACT

A microvalve includes a first plate having a surface, a recessed area provided within the surface, a fluid port provided within the recessed area, and a sealing structure extending about the fluid port, the sealing structure having at least one divot formed therein. A second plate has a surface adjacent the surface of the first plate and including a displaceable member that is movable between a closed position, wherein the displaceable member cooperates with the sealing structure to prevent fluid communication through the fluid port, and an open position, wherein the displaceable member does not cooperate with at least a portion of the sealing structure to prevent fluid communication through the fluid port.

15 Claims, 13 Drawing Sheets

(56) References Cited

U.S. PATENT DOCUMENTS

| | | | |
|---|---|---|---|
| 5,785,295 | A | 7/1998 | Tsai |
| 5,863,502 | A | 1/1999 | Southgate et al. |
| 6,116,863 | A | 9/2000 | Ahn et al. |
| 6,240,962 | B1 | 6/2001 | Tai et al. |
| 6,296,017 | B2 | 10/2001 | Kimizuka |
| 6,494,804 | B1 | 12/2002 | Hunnicutt et al. |
| 6,523,560 | B1 | 2/2003 | Williams et al. |
| 6,540,203 | B1 | 4/2003 | Hunnicutt |
| 6,698,454 | B2 | 3/2004 | Sjolander et al. |
| 6,761,420 | B2 | 7/2004 | Maluf et al. |
| 6,845,962 | B1 | 1/2005 | Barron et al. |
| 7,011,378 | B2 | 3/2006 | Maluf et al. |
| 7,803,281 | B2 | 9/2010 | Davies |
| 8,011,388 | B2 | 9/2011 | Fuller et al. |
| 8,113,482 | B2 | 2/2012 | Hunnicutt |
| 8,662,468 | B2 | 3/2014 | Hunnicutt |
| 8,807,962 | B2 | 8/2014 | Mayer |
| 9,488,293 | B2 * | 11/2016 | Fuller ................. F16K 99/0011 |
| 9,494,255 | B2 * | 11/2016 | Fuller ................. F16K 99/0011 |
| 9,512,936 | B2 * | 12/2016 | Fuller ................. F16K 99/0028 |
| 2010/0012195 | A1 * | 1/2010 | Hunnicutt ........... F16K 99/0001 137/1 |
| 2011/0168936 | A1 | 7/2011 | Reichenbach et al. |
| 2013/0240063 | A1 * | 9/2013 | Beisel .................... F16K 25/04 137/546 |
| 2014/0374633 | A1 | 12/2014 | Fuller et al. |
| 2016/0138733 | A1 | 5/2016 | Arunasalam et al. |

\* cited by examiner

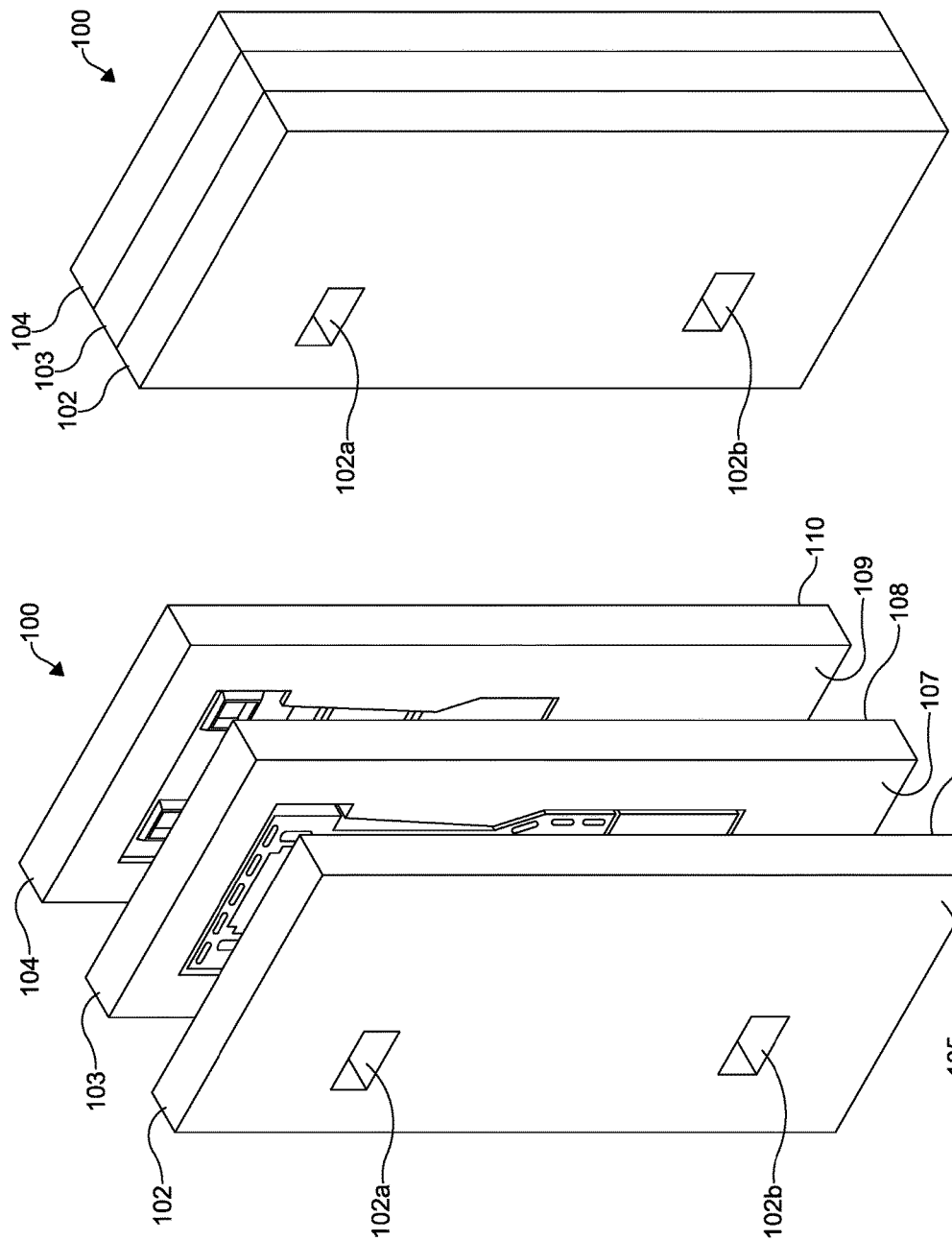

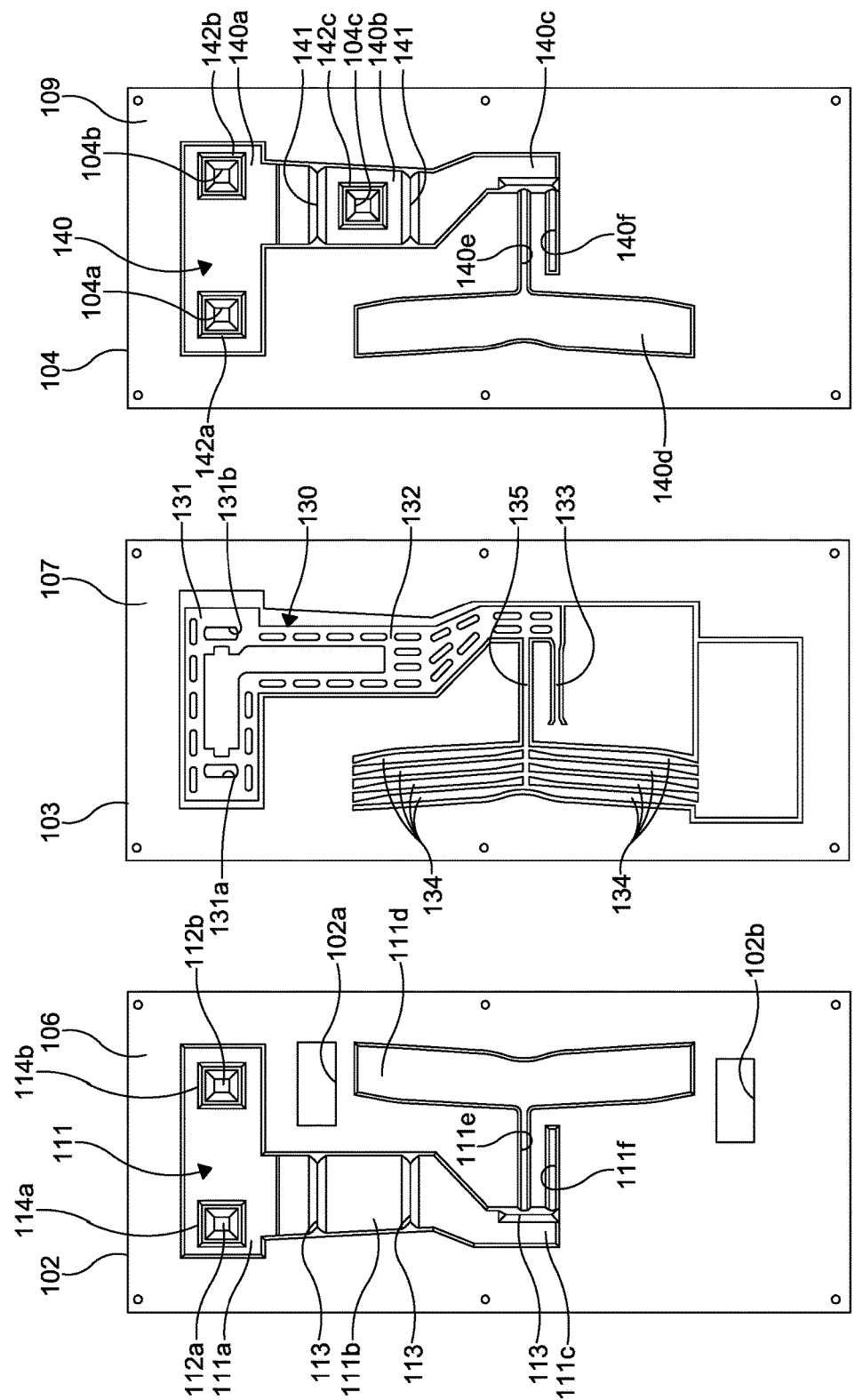

US 10,094,490 B2

MICROVALVE HAVING CONTAMINATION RESISTANT FEATURES

CROSS-REFERENCE TO RELATED APPLICATIONS

This application claims the benefit of U.S. Provisional Application No. 62/180,107, filed Jun. 16, 2015, the disclosure of which is incorporated herein by reference.

BACKGROUND OF THE INVENTION

This invention relates in general to microvalves for controlling the flow of fluid through a fluid circuit. In particular, this invention relates to an improved structure for such a microvalve that resists interference with the free movement of a displaceable member of the microvalve that might otherwise result from the presence of particulate contaminants contained in the fluid flowing therethrough.

Generally speaking, a micro-electro-mechanical system (MEMS) is a system that not only includes both electrical and mechanical components, but is additionally physically small, typically including features having sizes in the range of ten micrometers or smaller. The term "micro-machining" is commonly understood to relate to the production of three-dimensional structures and moving parts of such micro-electro-mechanical system devices. In the past, micro-electro-mechanical systems used modified integrated circuit (e.g., computer chip) fabrication techniques (such as chemical etching) and materials (such as silicon semiconductor material), which were micro-machined to provide these very small electrical and mechanical components. More recently, however, other micro-machining techniques and materials have become available.

As used herein, the term "micro-machined device" means a device including features having sizes in the micrometer range or smaller and, thus, is at least partially formed by micro-machining. As also used herein, the term "microvalve" means a valve including features having sizes in the micrometer range or smaller and, thus, is also at least partially formed by micro-machining. Lastly, as used herein, the term "microvalve device" means a micro-machined device that includes not only a microvalve, but further includes additional components. It should be noted that if components other than a microvalve are included in the microvalve device, these other components may be either micro-machined components or standard-sized (i.e., larger) components. Similarly, a micro-machined device may include both micro-machined components and standard-sized components.

A variety of microvalve structures are known in the art for controlling the flow of fluid through a fluid circuit. One well known microvalve structure includes a displaceable member that is supported within a closed internal cavity provided in a valve body for pivoting or other movement between a closed position and an opened position. When disposed in the closed position, the displaceable member substantially blocks a first fluid port that is otherwise in fluid communication with a second fluid port, thereby preventing fluid from flowing between the first and second fluid ports. When disposed in the opened condition, the displaceable member does not substantially block the first fluid port from fluid communication with the second fluid port, thereby permitting fluid to flow between the first and second fluid ports. U.S. Pat. Nos. 6,523,560, 6,540,203, and 6,845,962, and U.S. patent application Ser. No. 14/805,500 filed Jul. 22, 2015, the disclosures of which are incorporated herein by reference, also describe similar, known microvalve structures.

In these conventional microvalve structures, the thickness of the closed internal cavity is usually only slightly larger than the thickness of the displaceable member disposed therein. Thus, relatively small spaces are provided between the displaceable member and the adjacent portions of the microvalve that define the closed internal cavity. This is done so as to minimize the amount of undesirable leakage therethrough when the displaceable member is disposed in the closed position. However, it has been found that when this conventional microvalve structure is used to control the flow of fluid containing solid particles (such as particulate contaminants that may be contained within the fluid), such particles may become jammed between the displaceable member and the adjacent portions of the microvalve that define the closed internal cavity. The jamming of such particles can, in some instances, undesirably interfere with the free movement of the displaceable member between the closed and opened positions. Additionally, long term exposure to particulate contaminants contained within the fluid may result in undesirable scratching of sealing surfaces on the displaceable member and/or the adjacent portions of the microvalve that define the closed internal cavity. Thus, it would be desirable to provide an improved structure for a microvalve that resists interference with the free movement of a displaceable member of the microvalve that might otherwise result from the presence of particulate contaminants contained in the fluid flowing therethrough.

SUMMARY OF THE INVENTION

This invention relates to an improved structure for a microvalve that resists interference with the free movement of a displaceable member of the microvalve that might otherwise result from the presence of particulate contaminants contained in the fluid flowing therethrough. A first embodiment of the microvalve includes a first plate having a surface, a recessed area provided within the surface, a fluid port provided within the recessed area, and a sealing structure extending about the fluid port, the sealing structure having at least one divot formed therein. A second plate has a surface adjacent the surface of the first plate and includes a displaceable member that is movable between a closed position, wherein the displaceable member cooperates with the sealing structure to prevent fluid communication through the fluid port, and an open position, wherein the displaceable member does not cooperate with at least a portion of the sealing structure to prevent fluid communication through the fluid port.

A second embodiment of the microvalve includes a first plate having a surface, a recessed area provided within the surface, a fluid port provided within the recessed area, and a sealing structure extending about the fluid port. A second plate has a surface adjacent the surface of the first plate and includes a displaceable member having at least one hole formed at least partially therethrough adjacent the fluid port of the first plate. The displaceable member is movable between a closed position, wherein the displaceable member cooperates with the sealing structure to prevent fluid communication through the fluid port, and an open position, wherein the displaceable member does not cooperate with at least a portion of the sealing structure to prevent fluid communication through the fluid port.

A third embodiment of the microvalve includes a base plate, a cover plate, and an intermediate plate. The base plate includes a surface, a recessed area provided within the surface, a first inlet fluid port and an outlet fluid port provided within the recessed area, a first sealing structure extending outwardly from a bottom surface of the recessed area toward the intermediate plate and about the first inlet fluid port, and a second sealing structure extending outwardly from a bottom surface of the recessed area toward the intermediate plate and about the outlet fluid port. The cover plate includes a surface, a recessed area provided within the surface, a second inlet fluid port provided within the recessed area, and a third sealing structure extending about the second inlet fluid port. The intermediate plate has a first surface adjacent the surface of the base plate and a second surface adjacent the surface of the cover plate. The intermediate plate includes a displaceable member that is movable between a closed position, wherein the displaceable member cooperates with the first, second, and third sealing structures to prevent fluid communication between the first and second inlet fluid ports and the outlet fluid port, and an opened position, wherein the displaceable member does not cooperate with the first, second, and third sealing structures to prevent fluid communication between the first and second inlet fluid ports and the outlet fluid port.

Various aspects of this invention will become apparent to those skilled in the art from the following detailed description of the preferred embodiments, when read in light of the accompanying drawings.

BRIEF DESCRIPTION OF THE DRAWINGS

FIG. 1 is an exploded perspective view of a basic structure of a microvalve including a cover plate, an intermediate plate, and a base plate.

FIG. 2 is a perspective view of the basic structure of the microvalve illustrated in FIG. 1 shown assembled.

FIG. 3 is a plan view of an inner surface of a conventional cover plate for a prior art microvalve.

FIG. 4 is a plan view of a conventional intermediate plate for a prior art microvalve.

FIG. 5 is a plan view of an inner surface of a conventional base plate for a prior art microvalve.

DETAILED DESCRIPTION OF THE PREFERRED EMBODIMENTS

Figures 6, 7:
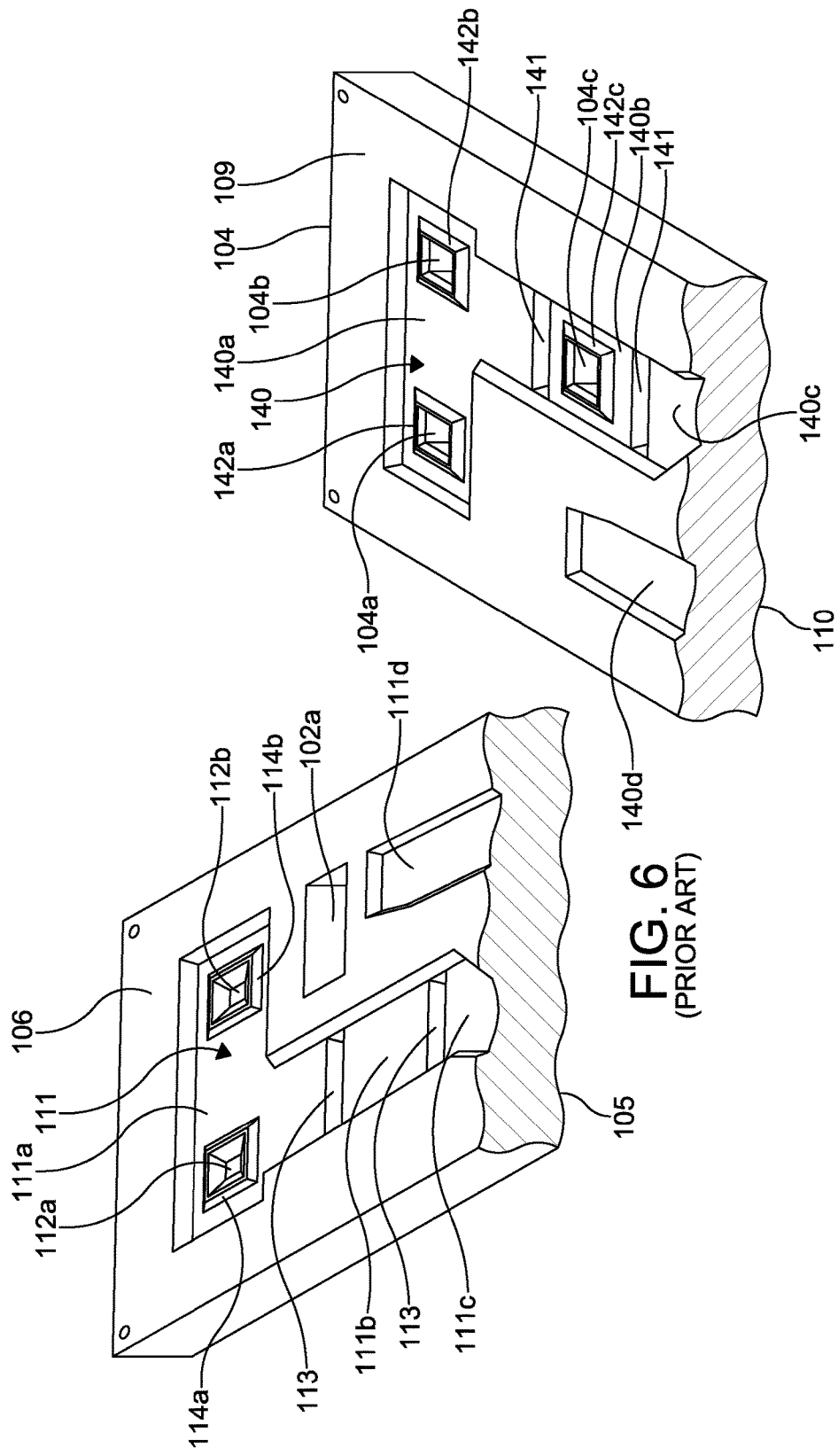
FIG. 6 is a perspective view of a portion of the inner surface of the conventional cover plate for a prior art microvalve shown in FIG. 3.
FIG. 7 is a perspective view of a portion of the inner surface of the conventional base plate for a prior art microvalve shown in FIG. 5.

Referring now to the drawings, there is illustrated in FIGS. 1 and 2 a basic structure of a microvalve 100 that, to the extent shown, is representative of both a conventional structure for a microvalve and an improved structure for a microvalve in accordance with this invention. The illustrated microvalve 100 includes a cover plate 102, an intermediate plate 103, and a base plate 104. The cover plate 102 has an outer surface 105 and an inner surface 106. The cover plate 102 also has one or more openings (two of such openings 102a and 102b are shown in the illustrated embodiment) formed therethrough that, in a manner that is well known in the art, allow one or more electrically conductive wires (not shown) to pass therethrough. The intermediate plate 103 has a first surface 107 and a second surface 108. The base plate 104 has an inner surface 109 and an outer surface 110. The base plate 104 also has a one or more openings (three of such openings 104a, 104b, and 104c are shown in FIGS. 5 and 7) formed therethrough that, in a manner that is well known in the art, allow fluid to flow into and out of the microvalve 100. In the illustrated embodiment, the opening 104b is configured as a normally closed inlet port, the opening 104a is configured as a normally open outlet port, and the opening 104c is configured as a control port. If desired however, the microvalve 100 may be configured such that the opening 104b is configured as an outlet port and the opening 104a is configured as an inlet port.

When the microvalve 100 is assembled as shown in FIG. 2, the inner surface 106 of the cover plate 102 engages the first surface 107 of the intermediate plate 103, and the inner surface 109 of the base plate 104 engages the second surface 108 of the intermediate plate 103. The cover plate 102, the intermediate plate 103, and the base plate 104 can be retained in this orientation in any desired manner. For example, portions of the cover plate 102 and/or the base plate 104 may be bonded to the intermediate plate 103, such as by fusion bonding, chemical bonding, or physically bonding (such as, for example, mechanical fasteners and/or adhesives). The cover plate 102, the intermediate plate 103, and the base plate 104 may be composed of any desired material or combination of materials. For example, the cover plate 102, the intermediate plate 103, and the base plate 104 may be composed of silicon and/or similar materials.

The structure of the inner surface 106 of the cover plate 102 of this invention is illustrated in detail in FIGS. 3 and 6. As shown therein, the cover plate 102 of this invention includes an actuator cavity, indicated generally at 111, that is provided on the inner surface 106 thereof. The illustrated actuator cavity 111 includes an upper actuator arm cavity portion 111a, a central actuator arm cavity portion 111b, a lower actuator arm cavity portion 111c, an actuator rib cavity portion 111*d*, an actuator spine cavity portion 111*e*, and a hinge cavity portion 111*f*. The upper actuator arm cavity portion 111*a* has a pair of recessed areas 112*a* and 112*b* provided therein. The recessed areas 112*a* and 112*b* define balance ports. In the conventional microvalve 100, particulate contaminants that may be contained within fluid flowing therethrough can accumulate in the balance port 112*b* opposite the normally open outlet port 104*a*. The illustrated actuator cavity 111 also has one or more pressure equalization depressions 113 provided therein.

The illustrated cover plate 102 has a first sealing structure 114*a* that extends from the bottom surface of the actuator cavity 111 and completely about the perimeter of the first recessed area 112*a*. Similarly, the cover plate 102 also has a second sealing structure 114*b* that extends from the bottom surface of the actuator cavity 111 and completely about the perimeter of the second recessed area 112*b*. In the illustrated embodiment, each of the sealing structures 114*a* and 114*b* is a wall that is generally trapezoidal in cross-sectional shape and includes four linearly-extending wall segments that extend adjacent to the four sides of the recessed areas 112*a* and 112*b*. However, the sealing structures 114*a* and 114*b* may be formed having any desired cross-sectional shape or combination of shapes, and may further extend in any desired manner (linearly or otherwise) about the recessed areas 112*a* and 112*b*. For example, the sealing structures 114*a* and 114*b* may be formed substantially as shown in FIGS. 3 and 6, but may have rounded corners between adjacent linearly-extending wall segments, have one or more non-linearly-extending wall segments, or be entirely non-linear in shape. The purpose for the sealing structures 114*a* and 114*b* will be explained below.

The structure of the intermediate plate 103 is illustrated in detail in FIG. 4. As shown therein, the intermediate plate 103 includes a displaceable member, indicated generally at 130, that includes a sealing portion 131 having a pair of openings 131*a* and 131*b* formed therethrough. The sealing portion 131 is connected through an elongated arm portion 132 to a hinge portion 133 that is formed integrally with the intermediate plate 103. The displaceable member 130 also includes a plurality of actuator ribs 134 that is connected through a central spine 135 to the elongated arm portion 132 at a location that is intermediate of the sealing portion 131 and the hinge portion 133.

As shown in FIG. 4, first ends of a first portion of the plurality of actuator ribs 134 (the upper ribs 134 when viewing FIG. 4) are flexibly joined at first ends thereof to a first non-moving part of the intermediate plate 103. Second ends of the first portion of the plurality of actuator ribs 134 are connected to the central spine 135. The first non-moving part of the intermediate plate 103 is electrically connected to a first bond pad (not shown) provided on the intermediate plate 103. Similarly, first ends of a second portion of the plurality of actuator ribs 134 (the lower ribs 134 when viewing FIG. 4) are flexibly joined at first ends thereof to a second non-moving part of the intermediate plate 103. Second ends of the second portion of the plurality of actuator ribs 134 are also connected to the central spine 135. The second non-moving part of the intermediate plate 103 is electrically connected to a second bond pad (not shown) provided on the intermediate plate 103. The second bond pad is electrically isolated from the first bond pad, other than through the plurality of actuator ribs 134.

In a manner that is well known in the art, electrical current may be passed from the first bond pad through the plurality of actuator ribs 134 to the second bond pad. Such electrical current causes thermal expansion of the plurality of actuator ribs 134, which causes axial movement of the central spine 135. The central spine 135 is connected to the elongated arm portion 132. Consequently, axial movement of the central spine 135 causes the elongated arm portion 132 (and, therefore, the sealing portion 131) of the displaceable member 130 to pivot about the hinge portion 133 or otherwise move relative to the rest of the intermediate plate 103 (such movement occurring within a plane defined by the rest of the intermediate plate 103). Thus, the illustrated displaceable member 130 functions as a conventional MEMS thermal actuator.

The structure of the inner surface 109 of the base plate 104 is illustrated in detail in FIGS. 5 and 7. As shown therein, the base plate 104 includes an actuator cavity, indicated generally at 140, that is provided on the inner surface 109 thereof. The illustrated actuator cavity 140 includes an upper actuator arm cavity portion 140*a*, a central actuator arm cavity portion 140*b*, a lower actuator arm cavity portion 140*c*, an actuator rib cavity portion 140*d*, an actuator spine cavity portion 140*e*, and a hinge cavity portion 140*f*. The illustrated actuator cavity 140 also has one or more pressure equalization depressions 141 provided therein.

The illustrated base plate 104 has a first sealing structure 142*a* that extends from the bottom surface of the actuator cavity 140 and completely about the perimeter of the opening 104*a*, a second sealing structure 142*b* that extends from the bottom surface of the actuator cavity 140 and completely about the perimeter of the opening 104*b*, and a third sealing structure 142*c* that extends from the bottom surface of the actuator cavity 140 and completely about the perimeter of the opening 104*c*. In the illustrated embodiment, each of the sealing structures 142*a* and 142*b* is a wall that is generally trapezoidal in cross-sectional shape and includes four linearly-extending wall segments that extend adjacent to the openings 104*a* and 104*b*. However, the sealing structures 142*a* and 142*b* may be formed having any desired cross-sectional shape or combination of shapes, and may further extend in any desired manner (linearly or otherwise) about the openings 104*a* and 104*b*. For example, the sealing structures 142*a* and 142*b* may have rounded corners between adjacent linearly-extending wall segments, have one or more non-linearly-extending wall segments, or be entirely non-linear in shape. The purpose for the sealing structures 142*a* and 142*b* will be explained below.

Figure 8:
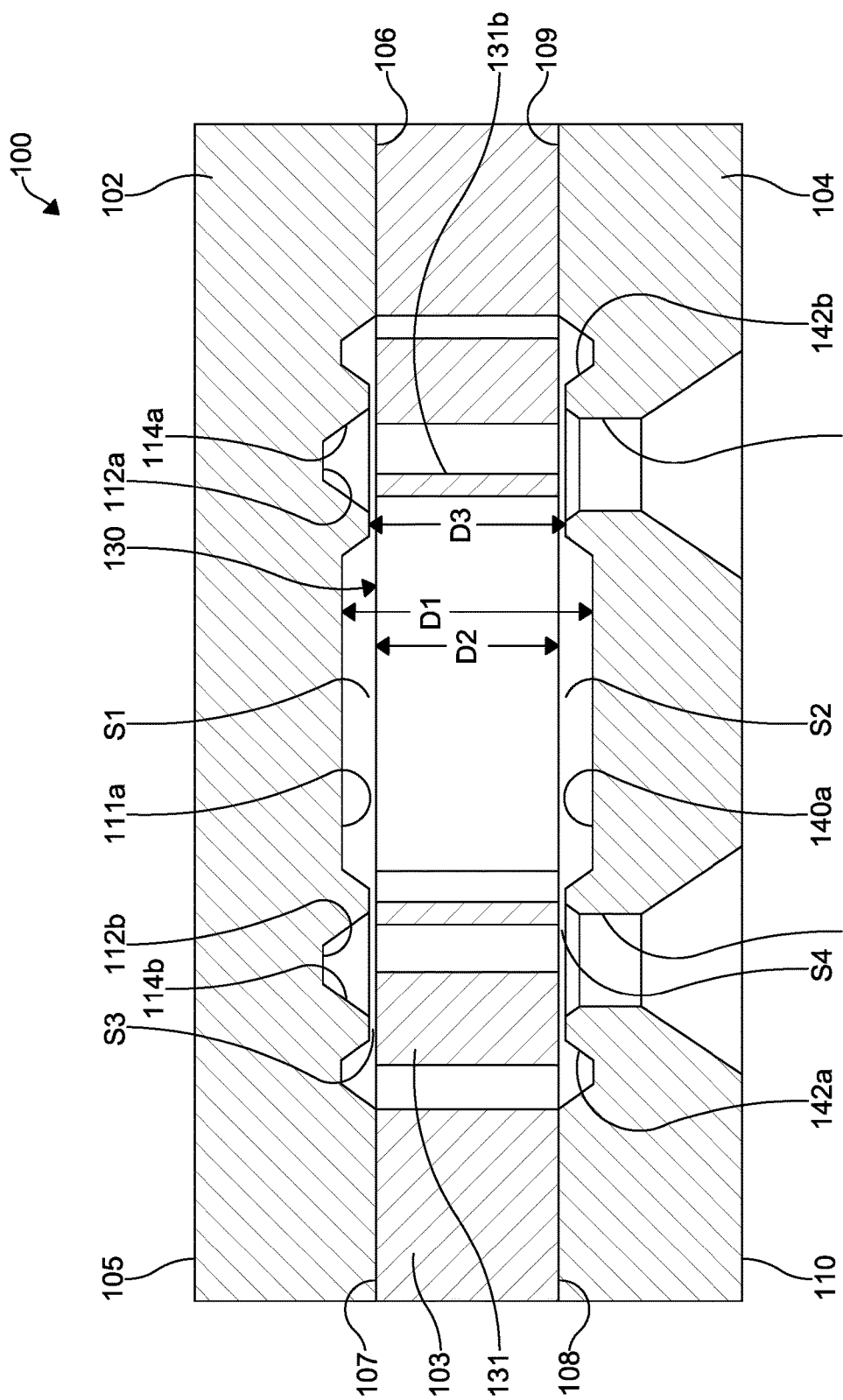
FIG. 8 is a sectional elevational view of the conventional cover plate, the intermediate plate, and the base plate illustrated in FIGS. 3 through 7 shown assembled and in an open position.
Figure 9:
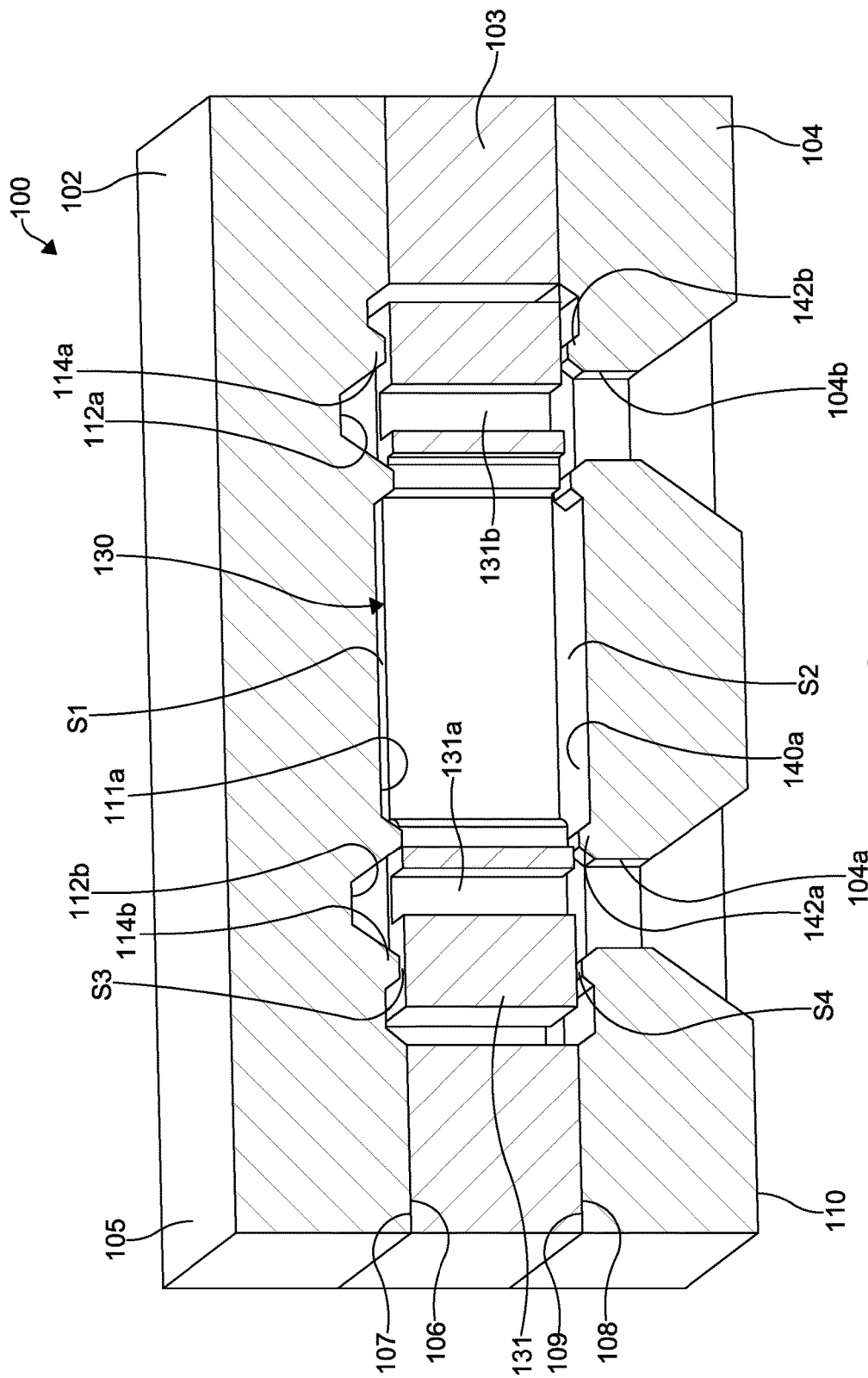
FIG. 9 is a sectional perspective view of the conventional cover plate, the intermediate plate, and the base plate illustrated in FIGS. 3 through 7 shown assembled and in an open position.

FIGS. 8 and 9 illustrate the structure of the assembled microvalve 100 shown in FIGS. 3 through 7 in an open position. As shown therein, non-recessed portions of the inner surface 106 of the cover plate 102 engage corresponding non-recessed portions of the first surface 107 of the intermediate plate 103. Similarly, non-recessed portions of the inner surface 109 of the base plate 104 engage corresponding non-recessed portions of the second surface 108 of the intermediate plate 103. The upper actuator arm cavity portion 111*a* provided on the cover plate 102, the intermediate plate 103, and the upper actuator arm cavity portion 140*a* provided on the base plate 104 all cooperate to define a closed internal cavity in which the sealing portion 131 of the displaceable member 130 is disposed for relative pivoting movement (movement to the left and to the right when viewing FIG. 8).

A first thickness D1 for the closed internal cavity is defined between a bottom surface of the upper actuator arm cavity portion 111*a* provided on the cover plate 102 and a bottom surface of the upper actuator arm cavity portion 140*a* provided on the base plate 104 (including the sealing portion 131 of the displaceable member 130 disposed therebetween). That first thickness D1 is significantly larger than a second thickness D2 that is defined by the opposed surfaces of the sealing portion 131 of the displaceable member 130. A third thickness D3 for the closed internal cavity is defined between extended surfaces of the sealing structures 114a and 114b provided on the cover plate 102 and extended surfaces of the sealing structures 142a and 142b provided on the base plate 104. Unlike the first thickness D1, that third thickness D3 is only slightly larger than the second thickness D2 that is defined by the opposed surfaces of the sealing portion 131 of the displaceable member 130.

As a result, a first relatively large space S1 is defined between the upper actuator arm cavity portion 111a provided on the cover plate 102 and the adjacent surface (the upper surface when viewing FIG. 8) of the displaceable member 130. As shown in FIG. 8, this first relatively large space S1 extends mostly, but not completely, throughout the upper actuator arm cavity portion 111a provided on the cover plate 102 and the adjacent (upper) surface of the sealing portion 131 of the displaceable member 130. The thickness of this first relatively large space S1 may be any desired value that is not likely to result in one or more particles (not shown) contained in the fluid leaking through such relatively large space S1 becoming jammed therebetween. For example, the thickness of this first relatively large space S1 may be approximately 50 μm.

Similarly, a second relatively large space S2 is defined between the upper actuator arm cavity portion 140a provided on the base plate 104 and the adjacent surface (the lower surface when viewing FIG. 8) of the displaceable member 130. As shown in FIG. 8, this second relatively large space S2 also extends mostly, but not completely, throughout the upper actuator arm cavity portion 140a provided on the base plate 104 and the adjacent (lower) surface of the sealing portion 131 of the displaceable member 130. The thickness of this second relatively large space S2 may be any desired value that is not likely to result in one or more particles (not shown) contained in the fluid leaking through such relatively large space S2 becoming jammed therebetween. For example, the thickness of this second relatively large space S2 may also be approximately 50 μm.

As mentioned above, the first and second sealing structures 114a and 114b extend from the bottom surface of the actuator cavity 111 and completely about the perimeter of the first and second recessed areas 112a and 112b, respectively. As a result, a first relatively small space S3 is defined between the first and second sealing structures 114a and 114b and the adjacent surface (the upper surface when viewing FIG. 8) of the displaceable member 130. This first relatively small space S3 extends completely throughout the perimeters of the first and second recessed areas 112a and 112b. The thickness of this first relatively small space S3 may be any desired value that is not likely to result in excessive leakage, as described above. For example, the thickness of this first relatively small space S3 may be approximately 3 μm.

Similarly, the first and second sealing structures 142a and 142b extend from the bottom surface of the actuator cavity 140 and completely about the perimeter of the first and second openings 104a and 104b, respectively. As a result, a second relatively small space S4 is defined between the first and second sealing structures 142a and 142b and the adjacent surface (the upper surface when viewing FIG. 8) of the displaceable member 130. This second relatively small space S4 extends completely throughout the perimeters of the first and second openings 104a and 104b. The thickness of this second relatively small space S4 may be any desired value that is not likely to result in excessive leakage, as described above. For example, the thickness of this second relatively small space S4 may be approximately 3 μm.

Figure 10:
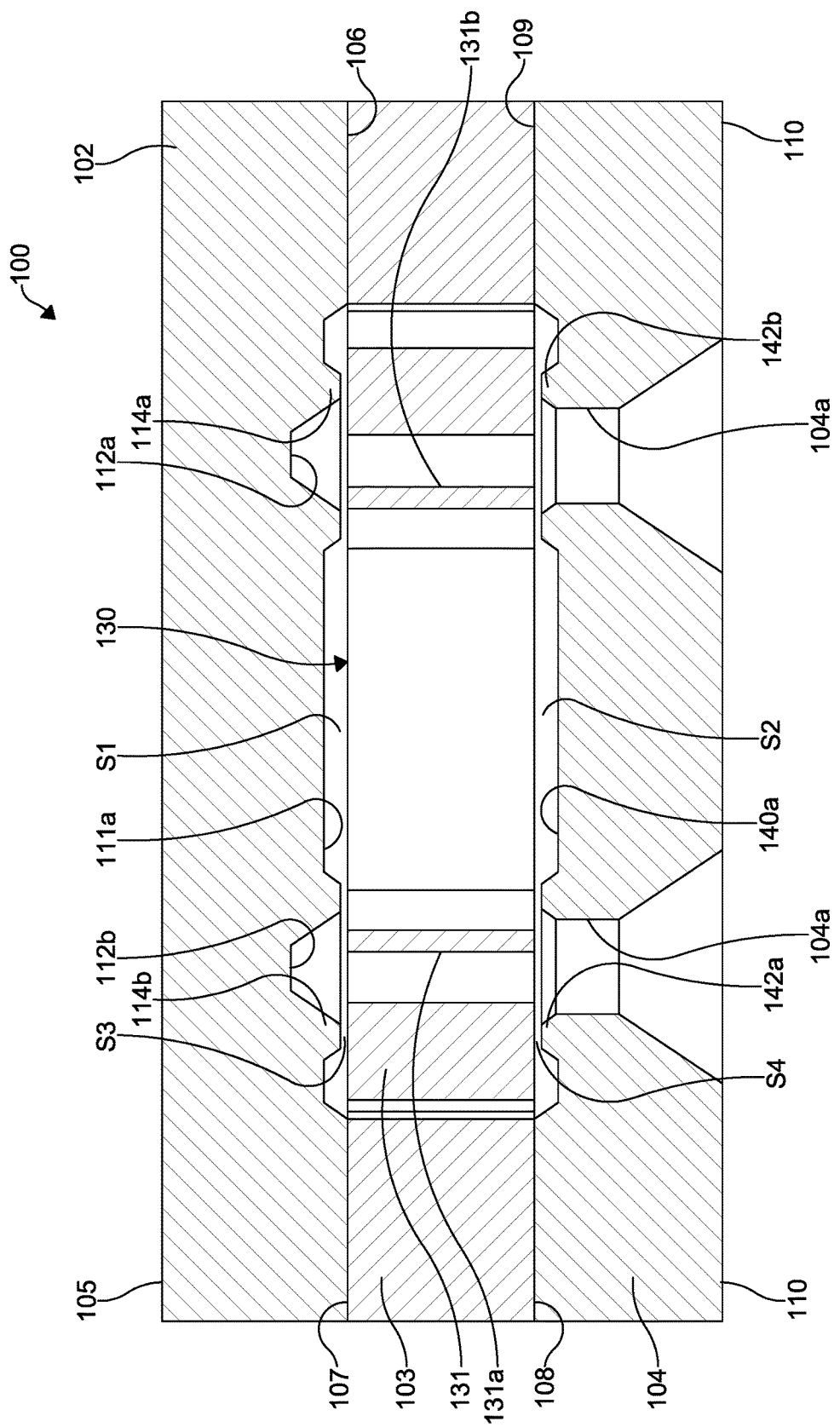
FIG. 10 is an alternate sectional elevational view of the conventional cover plate, the intermediate plate, and the base plate illustrated in FIGS. 3 through 7 shown assembled and in a closed position.
Figure 11:
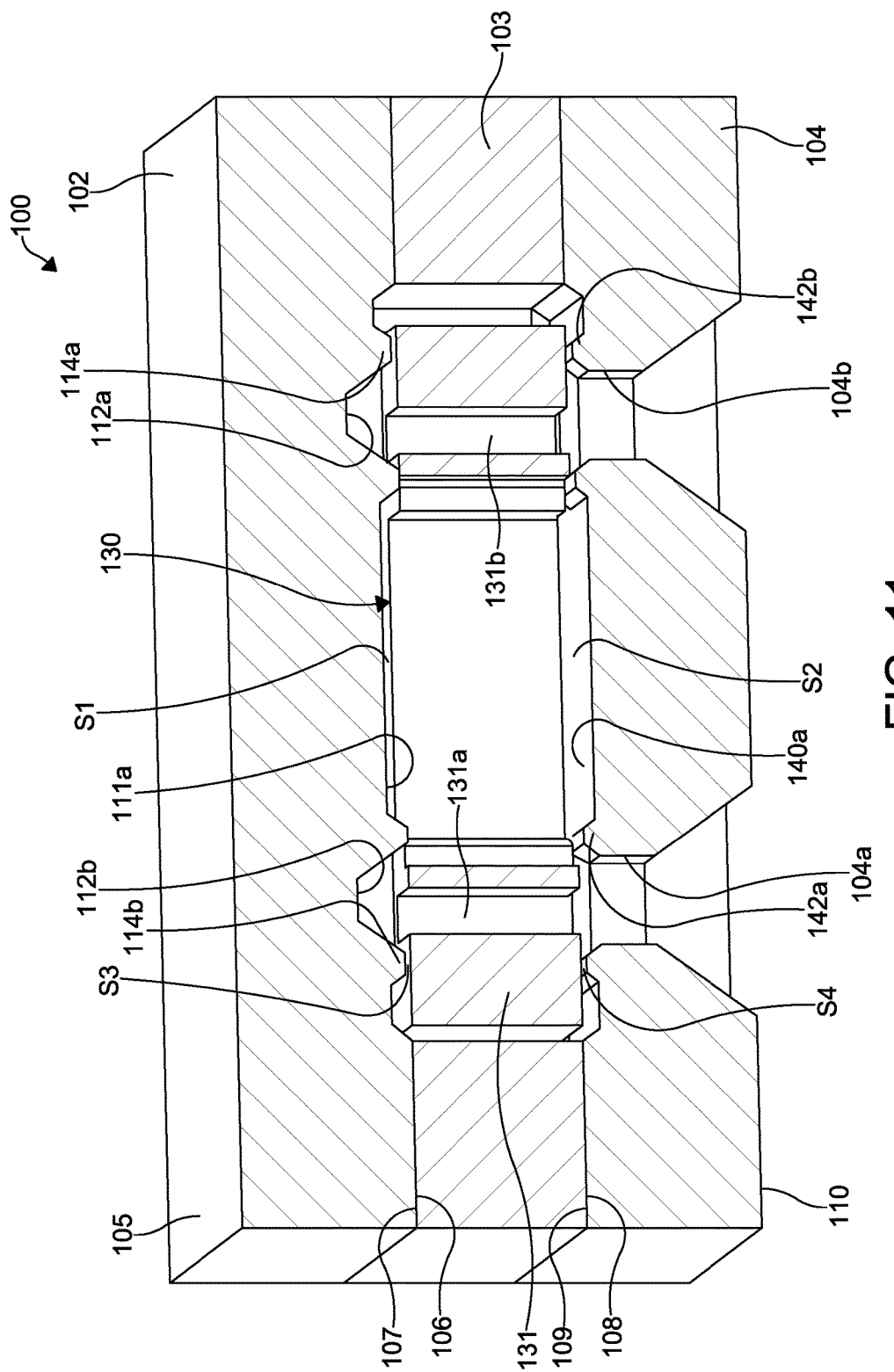
FIG. 11 is an alternate sectional perspective view of the conventional cover plate, the intermediate plate, and the base plate illustrated in FIGS. 3 through 7 shown assembled and in a closed position.

During use, the microvalve 100 can be operated in a conventional manner (or otherwise) to selectively move the displaceable member 130 between a closed position (illustrated in FIGS. 10 and 11) and the opened position (illustrated in FIGS. 8 and 9). When the displaceable member 130 is located in the closed position, it is desirable that as little fluid as possible flows between the first and second openings 104a and 104b. This is accomplished by providing both (1) the first and second sealing structures 114a and 114b that extend from the bottom surface of the actuator cavity 111 and completely about the perimeter of the first and second recessed areas 112a and 112b, respectively, and (2) the first and second sealing structures 142a and 142b that extend from the bottom surface of the actuator cavity 140 and completely about the perimeter of the first and second openings 104a and 104b, respectively. As discussed above, the relatively small thicknesses of the first and second relatively small spaces S3 and S4 is selected so as to not allow excessive leakage.

At the same time, however, the geometry of the microvalve 100 resists interference with the free movement of a displaceable member of the microvalve that might otherwise result from the presence of particulate contaminants contained in the fluid flowing therethrough. This is accomplished by provided both (1) the first relatively large space S1 between the upper actuator arm cavity portion 111a provided on the cover plate 102 and the adjacent surface of the displaceable member 130 (the upper surface when viewing FIGS. 8 through 11), and (2) the second relatively large space S2 between the upper actuator arm cavity portion 140a provided on the base plate 104 and the adjacent surface of the displaceable member 130 (the lower surface when viewing FIGS. 8 through 11). The relatively large thicknesses of the first and second relatively large spaces S1 and S2 is selected so as to prevent one or more particles (not shown) contained in the fluid leaking through the microvalve 100 from becoming jammed therebetween (or at least to minimize the number of such particles that may become jammed therebetween).

Figure 12:
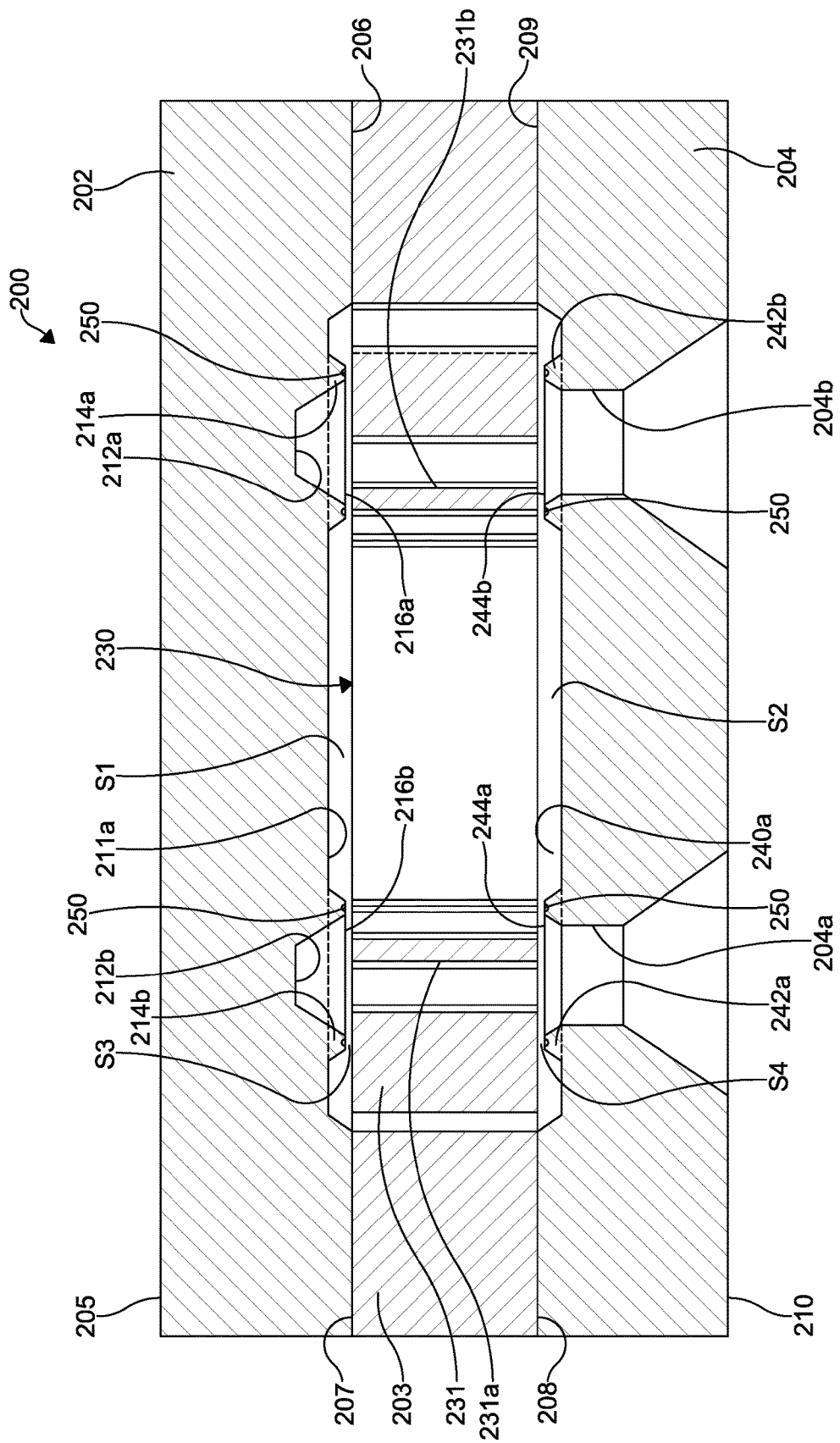
FIG. 12 is a sectional elevational view of an improved microvalve in accordance with a first embodiment of this invention, shown assembled and in a closed position.
Figure 13:
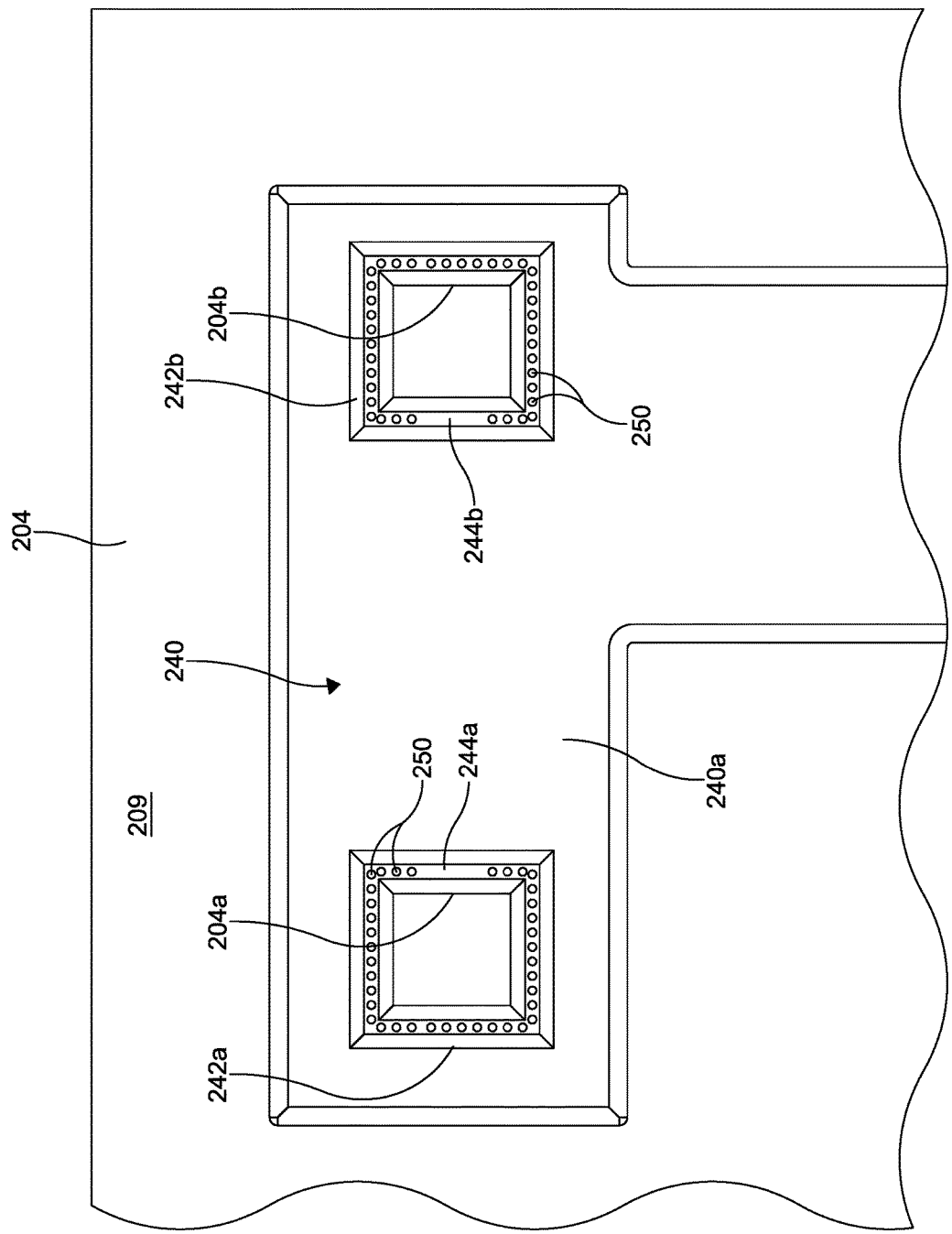
FIG. 13 is an enlarged plan view of a portion of the base plate illustrated in FIG. 12.

FIGS. 12 and 13 illustrate portions of an improved microvalve, indicated generally at 200, in accordance with a first embodiment of this invention that further improves resistance to contamination and thus further minimizes the likelihood of such undesirable jamming. The basic structure of the first embodiment of the microvalve 200 is similar to that shown in FIGS. 1 and 2 and, therefore, includes a cover plate 202, an intermediate plate 203, and a base plate 204. The cover plate 202 has an outer surface 205 and an inner surface 206. The cover plate 202 also has one or more openings (not shown in FIG. 12) formed therethrough that, in a manner that is well known in the art, allow one or more electrically conductive wires (not shown) to pass therethrough. The intermediate plate 203 has a first surface 207 and a second surface 208. The base plate 204 has an inner surface 209 and an outer surface 210. The base plate 204 also has one or more openings (two of such openings 204a and 204b are shown in the illustrated embodiment) formed therethrough that, in a manner that is well known in the art, allow fluid to flow into and out of the microvalve 200.

When the microvalve 200 is assembled as shown in FIG. 12, the inner surface 206 of the cover plate 202 engages the first surface 207 of the intermediate plate 203, and the inner surface 209 of the base plate 204 engages the second surface 208 of the intermediate plate 203. The cover plate 202, the intermediate plate 203, and the base plate 204 can be retained in this orientation in any desired manner. For example, portions of the cover plate 202 and/or the base plate 204 may be bonded to the intermediate plate 203, such as by fusion bonding, chemical bonding, or physically bonding (such as, for example, mechanical fasteners and/or adhesives). The cover plate 202, the intermediate plate 203, and the base plate 204 may be composed of any desired material or combination of materials. For example, the cover plate 202, the intermediate plate 203, and the base plate 204 may be composed of silicon, such as single crystal silicon, and/or similar materials.

Like the microvalve 100, the cover plate 202 of this invention includes the actuator cavity, the upper actuator arm cavity portion 211a of which is illustrated in FIG. 12. The upper actuator arm cavity portion 211a has a pair of recessed areas 212a and 212b provided therein. The cover plate 202 of this invention also has a first sealing structure 214a that extends from the bottom surface of the upper actuator arm cavity portion 211a and completely about the perimeter of the first recessed area 212a. Similarly, the cover plate 202 of this invention also has a second sealing structure 214b that extends from the bottom surface of the upper actuator arm cavity portion 211a and completely about the perimeter of the second recessed area 212b. Like the sealing structures 114a and 114b, each of the sealing structures 214a and 214b is a wall that is generally trapezoidal in cross-sectional shape and includes a sealing surface 216a and 216b, respectively.

The base plate 204 of this invention includes an actuator cavity, the upper actuator arm cavity portion 240a of which is illustrated in FIG. 12. The base plate 204 of this invention has a first sealing structure 242a that extends from the bottom surface of the upper actuator arm cavity portion 240a and completely about the perimeter of the first opening 204a. Similarly, the base plate 204 of this invention also has a second sealing structure 242b that extends from the bottom surface of the upper actuator arm cavity portion 240a and completely about the perimeter of the second opening 204b. Like the sealing structures 142a and 142b, each of the sealing structures 242a and 242b is a wall that is generally trapezoidal in cross-sectional shape and includes a sealing surface 244a and 244b, respectively.

The intermediate plate 203 of this invention includes a displaceable member 230, that includes a sealing portion 231 having a pair of openings 231a and 231b formed therethrough.

In the illustrated embodiment, each of the sealing structures 214a and 214b has a plurality of depressions or divots 250 formed in the respective sealing surfaces 216a and 216b thereof. Similarly, each of the sealing structures 242a and 242b has a plurality of the divots 250 formed in the respective sealing surfaces 244a and 244b thereof. The illustrated divots 250 have a substantially circular opening shape at the sealing surfaces 244a and 244b, a diameter within the range of about 20 μm to about 30 μm, and a depth within the range of about 20 μm to about 30 μm. Alternatively, the divots 250 may have any desired opening shape, such as oval, rectangular, and square. As shown, the divots 250 have a rounded, substantially conical inside surface. Alternatively, the inside surface of the divots 250 may have any desired rounded shape, such as a semi-spherical shape, or any other desired shape or combination of shapes.

In the illustrated embodiment, a plurality of divots 250 are formed in each of the four walls of the sealing structures 214a, 214b, 242a, and 242b. Alternatively, any desired number of divots 250 may be formed on any one or more walls of the sealing structures 214a, 214b, 242a, and 242b. For example, the divots 250 may be formed on any one or more walls of the sealing structures 214a and 214b of the cover plate 202, or the divots 250 may be formed on any one or more walls of the sealing structures 242a and 242b of the base plate 204.

Advantageously, by providing the divots 250 in the sealing surfaces 216a, 216b, 244a, and 244b, particulate contaminants contained within the fluid are able to move within the flowing fluid to areas wherein the particulate contaminants cannot undesirably scratch or erode the sealing surfaces 216a, 216b, 244a, and 244b, or the adjacent surfaces 207 and 208 of the displaceable member 230, such as within the first relatively large space S1, the second relatively large space S2, the recessed areas 212a and 212b, and the openings 204a and 204b.

Figure 14:
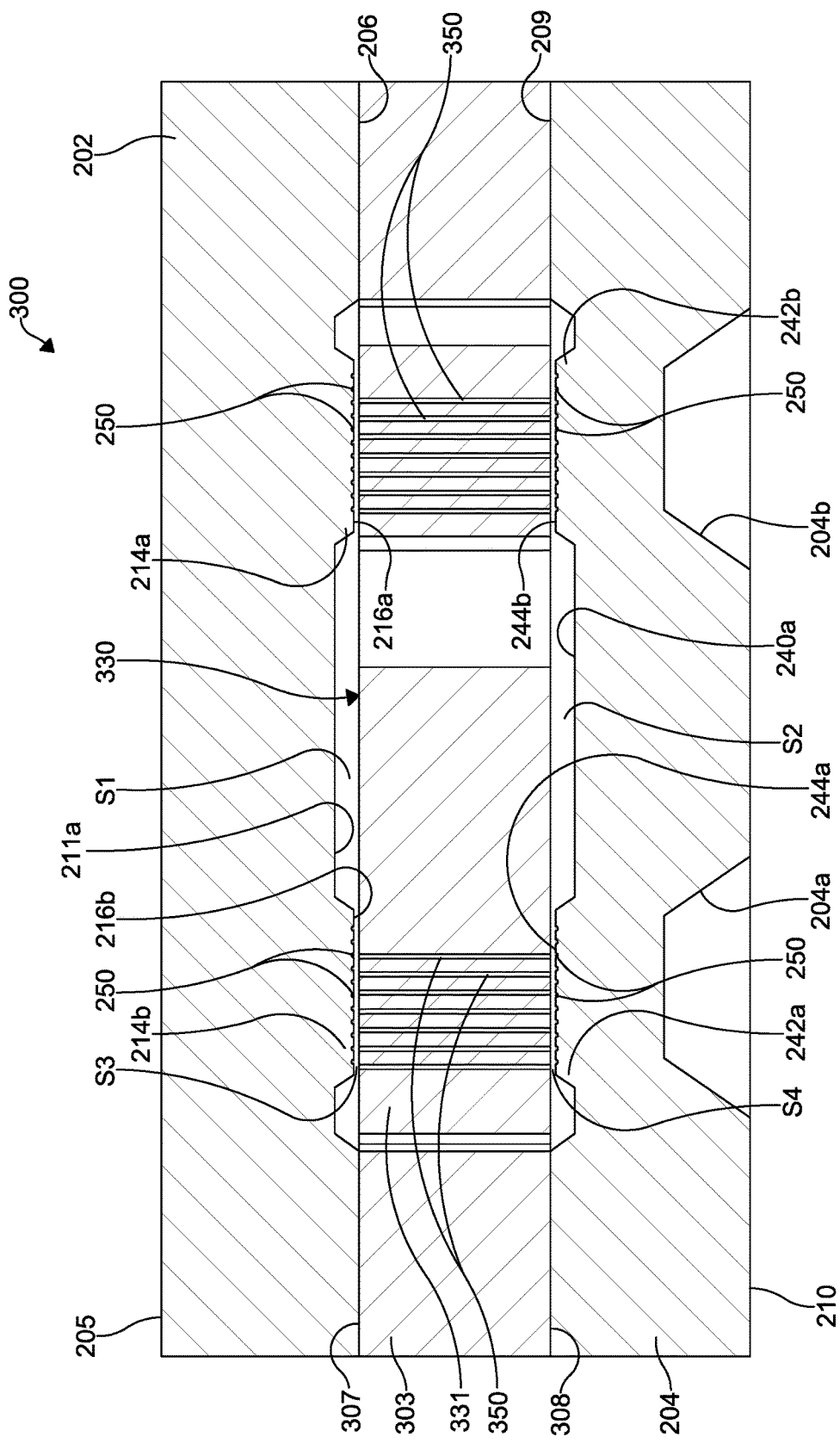
FIG. 14 is a sectional elevational view of an improved microvalve in accordance with a second embodiment of this invention, shown assembled and in a closed position.
Figure 15:
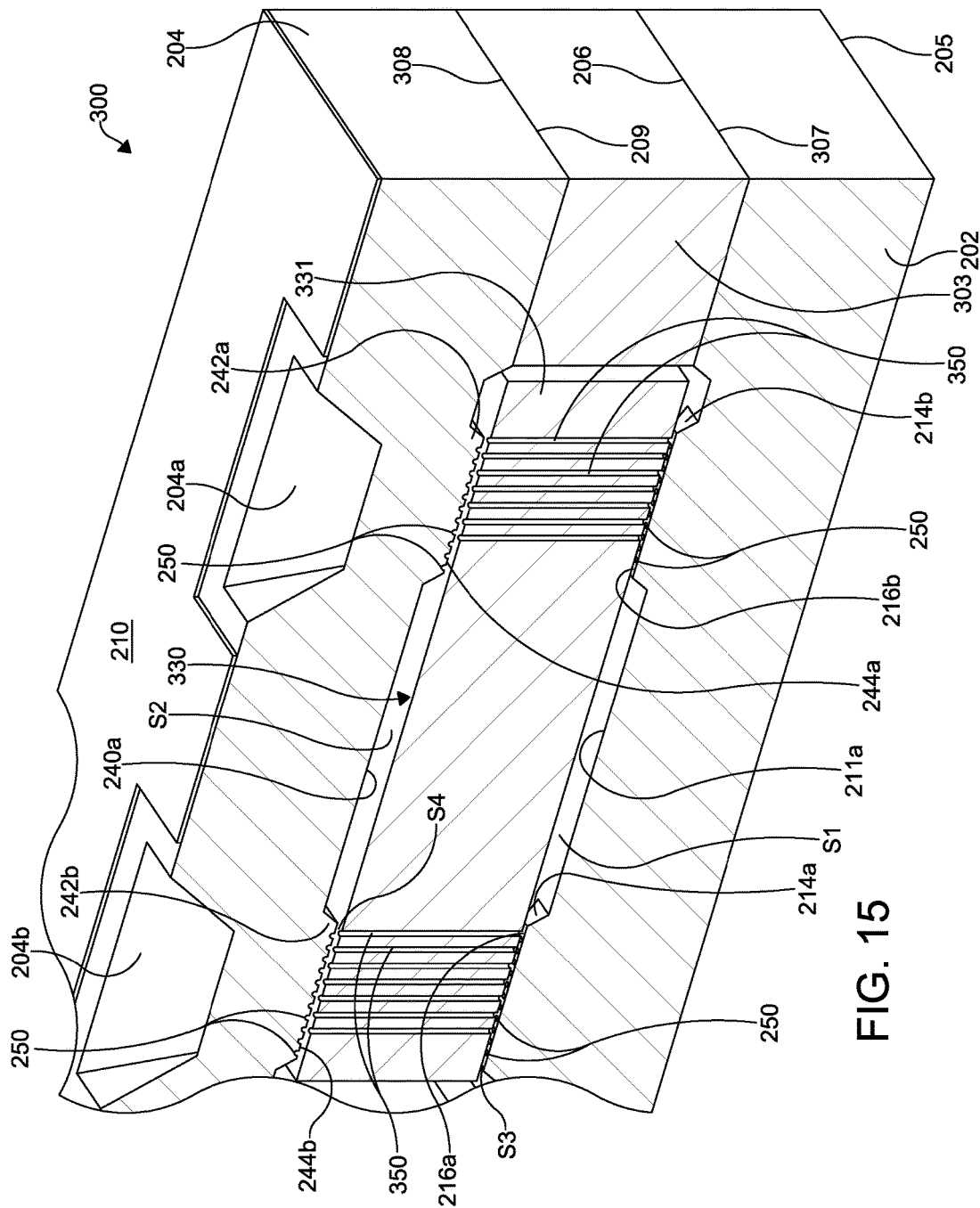
FIG. 15 is an inverted sectional perspective view of the second embodiment of the microvalve illustrated in FIG. 14 shown assembled.
Figure 16:
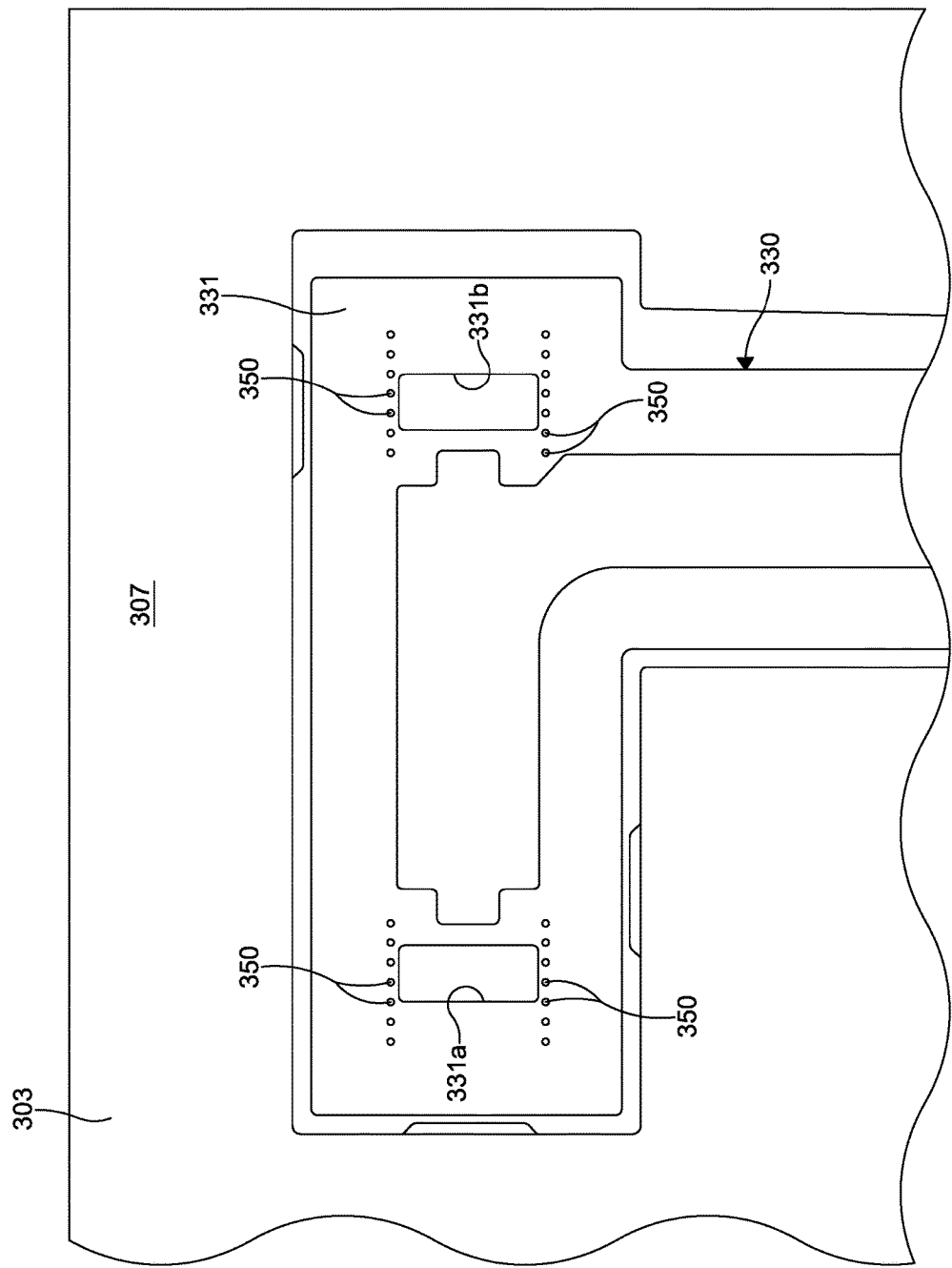
FIG. 16 is an enlarged plan view of a portion of the intermediate plate illustrated in FIGS. 14 and 15.

A second embodiment of the improved microvalve is indicated generally at 300 in FIGS. 14 through 16. Like the first embodiment of the microvalve 200, the second embodiment of the microvalve 300 provides improved resistance to contamination and thus further minimizes the likelihood of undesirable jamming. The second embodiment of the microvalve 300 includes the cover plate 202, the base plate 204, and a modified intermediate plate 303. The intermediate plate 303 has a first surface 307 and a second surface 308 and includes the displaceable member 330, including a sealing portion 331 having a pair of openings 331a and 331b formed therethrough.

In the illustrated embodiment, a plurality of holes 350 are formed through the sealing portion 331 adjacent the openings 331a and 331b. As best shown in FIG. 15, the plurality of holes 350 are formed such that they are configured in rows and aligned with at least one wall of the sealing structures 214a, 214b, 242a, and 242b. The illustrated holes 350 are elongated with a substantially circular cross-sectional shape, have a diameter within the range of about 20 μm to about 30 μm, and extend completely through the sealing portion 331. In the illustrated embodiment, four rows of holes 350 are formed in the sealing portion 331. Alternatively, any desired number of holes 350 may be formed adjacent any one or more walls of the sealing structures 214a, 214b, 242a, and 242b.

The illustrated holes 350 have a substantially circular cross-sectional shape. Alternatively, the holes 350 may have any desired cross-sectional shape, such as oval, rectangular, and square. Additionally, the holes 350 may extend completely through the sealing portion 331 as illustrated, or may extend only partially through one or both of the first surface 307 and the second surface 308 of the sealing portion 331.

Alternatively, the improved microvalve in accordance with the invention may include the intermediate plate 303 assembled with the conventional cover plate 202 and/or the conventional base plate 204.

Advantageously, by providing the holes 350 through the intermediate plate 303, either with or without the divots 250 being formed on one or more walls of the sealing structures 214a, 214b, 242a, and 242b, particulate contaminants contained within the fluid are able to move within the flowing fluid to areas wherein the particulate contaminants cannot undesirably scratch or erode the sealing surfaces 216a, 216b, 244a, and 244b, or the adjacent surfaces 307 and 308 of the displaceable member 330, such as within the first relatively large space S1, the second relatively large space S2, the recessed areas 212a and 212b (shown in FIG. 12), and the openings 204a and 204b.

Figure 17:
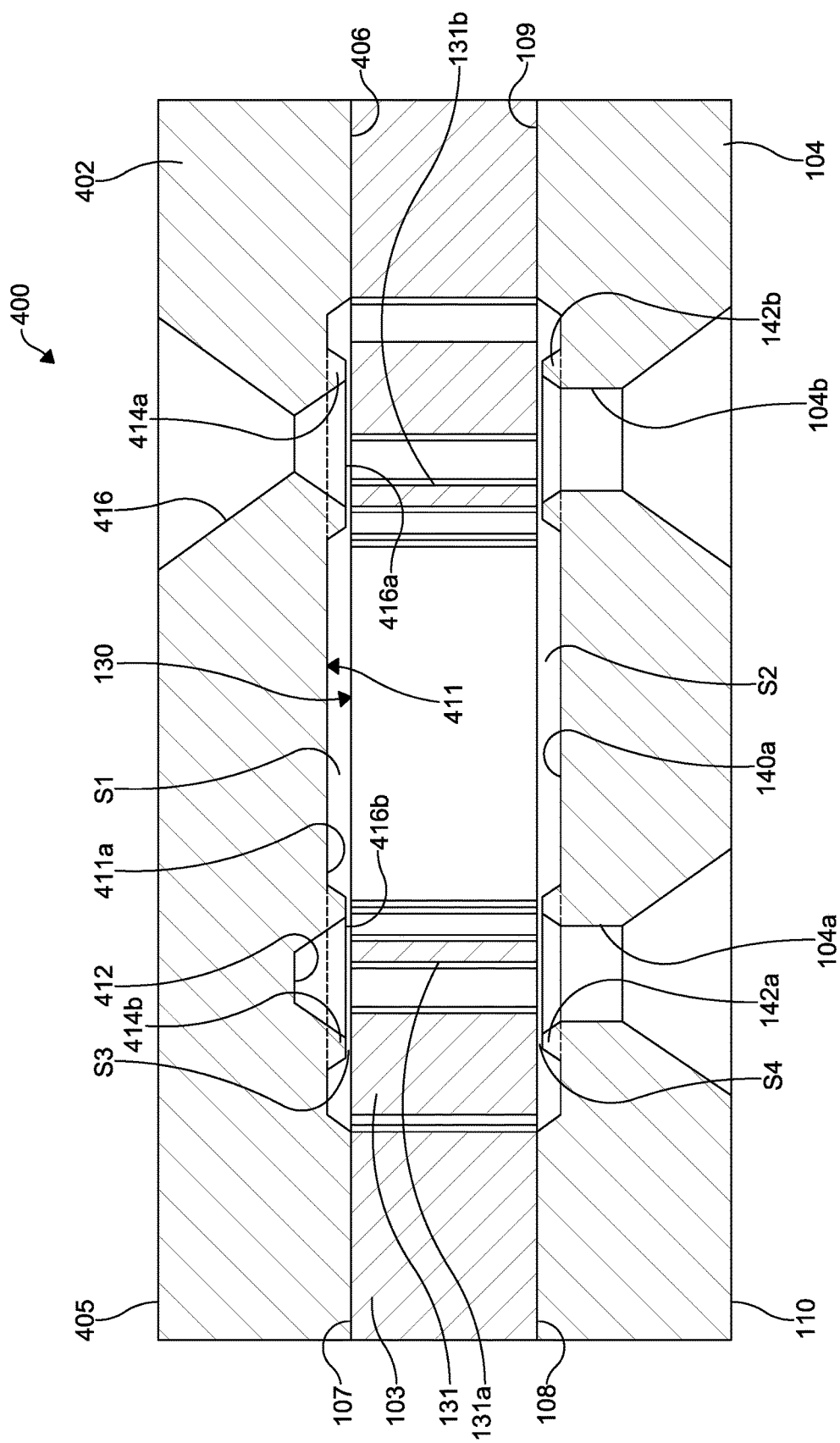
FIG. 17 is a sectional elevational view of an improved microvalve in accordance with a third embodiment of this invention, shown assembled and in a closed position.

A third embodiment of the improved microvalve is indicated generally at 400 in FIG. 17. The third embodiment of the microvalve 400 includes the base plate 104, the intermediate plate 103, and a modified cover plate 402. The cover plate 402 is similar to the cover plate 102 and includes an outer surface 405, an inner surface 406, and an actuator cavity 411, an upper actuator arm cavity portion 411a of which is illustrated in FIG. 17. The upper actuator arm cavity portion 411a has a recessed area 412 provided therein. Additionally, the upper actuator arm cavity portion 411a has an additional opening, configured as a second normally closed inlet port 416, formed therein opposite the inlet port 104b of the base plate 104.

The cover plate 402 of this invention also has a first sealing structure 414a that extends from the bottom surface of the upper actuator arm cavity portion 411a and completely about the perimeter of the second normally closed inlet port 416. Similarly, the illustrated cover plate 402 also has a second sealing structure 414b that extends from the bottom surface of the upper actuator arm cavity portion 411a and completely about the perimeter of the recessed area 412. Each of the sealing structures 414a and 414b is a wall that is generally trapezoidal in cross-sectional shape and includes a sealing surface, 416a and 416b respectively.

As shown in FIG. 17, the balance port 112a of the microvalve 100 has been replaced with an additional opening or fluid flow port, configured as the second normally closed inlet port 416, formed through the cover plate 402. Fluid is thus allowed to flow into the microvalve 400 through the two normally closed inlet ports 104b and 416 from opposite sides of the intermediate plate 103. Advantageously, this structure allows particulate contaminants that may be contained within the fluid, and that would otherwise accumulate in the balance port 114b, to pass out of the sealing area near the sealing structures 142b and 414a and thus reduce the occurrence of undesirable scratching and jamming.

Alternatively, any of the sealing structures 142a, 142b, 414a, and 414b of the improved microvalve 400 may be formed with the divots 250 described above. Additionally, the sealing portion 131 of the displaceable member 130 may be formed with one or more of the holes 350 described above.

The first and second embodiments of the microvalve 200 and 300, respectively, illustrated in FIGS. 12 through 16 are packaged in a conventional U-flow configuration, wherein the openings 104a and 104b (which define the outlet and inlet for the flow of fluid through the microvalves 200 and 300) are located on the same side (the base plate 204 side) of the microvalves 200 and 300. Alternatively, the microvalves 200 and 300 may be packaged in a conventional through-flow configuration, wherein the openings 204a, 204b, and any other port, such as a control port (not shown in FIGS. 12 through 17, but shown at 104c in FIGS. 5 and 7) are located on opposite sides (on the cover plate 202 and the base plate 204 sides) of the microvalves 200 and 300. The microvalve 400 may also be packaged in a conventional through-flow configuration. The structure and manner of operation of such through-flow configured microvalves is otherwise similar to the embodiments of the microvalves 200, 300, and 400 described herein.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A microvalve comprising:
    a first plate including a surface, a recessed area provided within the surface, and a fluid port provided within the recessed area;
    a second plate; and
    a sealing structure defining a sealing surface and extending outwardly from a bottom surface of the recessed area of the first plate toward the second plate and about the fluid port, the sealing surface of the sealing structure having at least one divot formed therein;
    wherein the second plate has a first surface that faces the sealing surface of the first plate and includes a displaceable member that is movable between a closed position wherein the displaceable member cooperates with the sealing structure to prevent fluid communication through the fluid port, and an open position wherein the displaceable member does not cooperate with at least a portion of the sealing structure to prevent fluid communication through the fluid port.

2. The microvalve according to claim 1, wherein the at least one divot in the sealing surface of the sealing structure is configured such that particulate contaminants contained within fluid flowing through the microvalve are able to move within the flowing fluid, into the at least one divot, and to one of the recessed area and the fluid port in the first plate.

3. The microvalve according to claim 1, wherein the sealing structure is a wall that extends about the fluid port.

4. The microvalve according to claim 3, wherein the sealing structure has a trapezoidal cross-sectional shape.

5. The microvalve according to claim 3, wherein the at least one divot has a rounded and substantially conical inside surface.

6. The microvalve according to claim 1, wherein the first plate is a base plate and the second plate is an intermediate plate, the intermediate plate having the first surface that faces the sealing surface of the base plate and a second surface, the microvalve further including:
    a cover plate having a surface, a recessed area provided within the surface of the cover plate, and one of a fluid port and a depression provided within the recessed area;
    a sealing structure defining a sealing surface and extending outwardly from a bottom surface of the recessed area of the cover plate toward the intermediate plate and about the one of the fluid port and the depression;
    wherein the second surface of the intermediate plate faces the sealing surface of the surface of the cover plate; and
    wherein the sealing surface of the sealing structure of the cover plate has at least one divot formed therein.

7. The microvalve according to claim 6, wherein the at least one divot in the sealing surface of each sealing structure is configured such that particulate contaminants contained within fluid flowing through the microvalve are able to move within the flowing fluid, into the at least one divot, and to one of the recessed area in the base plate, the recessed area in the cover plate, the fluid port in the base plate, and the one of a fluid port and a depression in the cover plate.

8. The microvalve according to claim 6, wherein each sealing structure is a wall that extends about each of the fluid port in the base plate and the one of a fluid port and a depression in the cover plate.

9. The microvalve according to claim 8, wherein the sealing structure has a trapezoidal cross-sectional shape.

10. The microvalve according to claim 8, wherein the at least one divot has a rounded and substantially conical inside surface.

11. A microvalve comprising:
a first plate including a surface, a recessed area provided within the surface, and a fluid port provided within the recessed area;
a second plate; and
a sealing structure defining a sealing surface and extending outwardly from a bottom surface of the recessed area of the first plate toward the second plate and about the fluid port;
wherein the second plate has a first surface that faces the sealing surface of the first plate and includes a displaceable member having at least one hole formed at least partially therethrough, the displaceable member movable between a closed position wherein the displaceable member cooperates with the sealing structure to prevent fluid communication through the fluid port, and an open position wherein the displaceable member does not cooperate with at least a portion of the sealing structure to prevent fluid communication through the fluid port;
wherein an opening of the at least one hole faces the sealing surface of the sealing structure, and an axis of the at least one hole is aligned with and intersects the sealing structure in both the open position and the closed position;
wherein the at least one hole formed through the displaceable member is configured such that particulate contaminants contained within fluid flowing through the microvalve are able to move within the flowing fluid, into the at least one hole, and to one of the recessed area and the fluid port in the first plate;
wherein the sealing structure is a wall that extends about the fluid port; and
wherein at least one divot is formed in the sealing surface of the sealing structure.

12. The microvalve according to claim 11, wherein the sealing structure has a trapezoidal cross-sectional shape.

13. The microvalve according to claim 11, wherein the at least one divot has a rounded and substantially conical inside surface.

14. A microvalve comprising:
a base plate including a surface, a recessed area provided within the surface, and a fluid port provided within the recessed area;
an intermediate plate;
a cover plate having a surface, wherein the second surface of the intermediate plate faces the surface of the cover plate;
a sealing structure defining a sealing surface and extending outwardly from a bottom surface of the recessed area of the base plate toward the intermediate plate and about the fluid port; and
a sealing structure defining a sealing surface and extending outwardly from a bottom surface of the recessed area of the cover plate toward the intermediate plate and about the one of a fluid port and a depression;
wherein the intermediate plate has a first surface that faces the sealing surface of the base plate and includes a displaceable member having at least one hole formed at least partially therethrough, the displaceable member movable between a closed position, wherein the displaceable member cooperates with the sealing structure to prevent fluid communication through the fluid port, and an open position, wherein the displaceable member does not cooperate with at least a portion of the sealing structure to prevent fluid communication through the fluid port;
wherein an opening of the at least one hole faces the sealing surface of the sealing structure, and an axis of the at least one hole is aligned with and intersects the sealing structure in both the open position and the closed position;
wherein a recessed area is provided within the surface of the cover plate, and one of a fluid port and a depression is provided within the recessed area;
wherein the sealing surfaces of the sealing structures of the base plate and the cover plate have at least one divot formed therein; and
wherein the sealing structures have a trapezoidal cross-sectional shape.

15. The microvalve according to claim 14, wherein the sealing structure of the cover plate is a wall, wherein an opening of the at least one hole formed through the displaceable member faces the sealing surface of the sealing structure, and an axis of the at least one hole is aligned with and intersects a portion of the wall of the sealing structure of the cover plate in both the open position and the closed position.

* * * * *